US011657363B2

(12) United States Patent
Park et al.

(10) Patent No.: US 11,657,363 B2
(45) Date of Patent: *May 23, 2023

(54) SYSTEMS AND COMPUTERIZED METHODS FOR OPTIMIZING ITEM RETRIEVAL ALLOCATION EFFICIENCIES

(71) Applicant: Coupang, Corp., Seoul (KR)

(72) Inventors: Sung Jin Park, Seoul (KR); Chang Geun Jin, Seoul (KR); Lianxi Bai, Seoul (KR); Seon Sook Hong, Seoul (KR); Kyeong Suk Jin, Seoul (KR); Eung Soo Lee, Gyenoggi-Do (KR); Woong Kim, Gyeonggi-Do (KR); Xiufang Zhu, Beijing (CN); Zhongnan Li, Shanghai (CN); Leming Lv, Shanghai (CN); Jaehyun Kim, Seoul (KR); Yong-Cho Hwang, Seoul (KR); Erik Rehn, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/449,905

(22) Filed: Oct. 4, 2021

(65) Prior Publication Data

US 2022/0129848 A1    Apr. 28, 2022

Related U.S. Application Data

(63) Continuation of application No. 17/082,792, filed on Oct. 28, 2020, now Pat. No. 11,176,513.

(51) Int. Cl.
*G06Q 10/08*    (2023.01)
*G06Q 10/0835*  (2023.01)
(Continued)

(52) U.S. Cl.
CPC ..... *G06Q 10/08355* (2013.01); *G06Q 10/047* (2013.01); *G06Q 10/087* (2013.01);
(Continued)

(58) Field of Classification Search
CPC .. G06Q 10/08; G06Q 10/083; G06Q 10/0832; G06Q 10/0833; G06Q 10/0385; G06Q 10/0837; G06Q 10/0838
See application file for complete search history.

(56) References Cited

U.S. PATENT DOCUMENTS 8,306,650 B1    11/2012 Antony et al.
9,466,045 B1    10/2016 Kumar
(Continued)

FOREIGN PATENT DOCUMENTS

CN    105469201 A    4/2016
CN    106956883 A    7/2017
(Continued)

OTHER PUBLICATIONS

Z. Zhao, J. Fang, G. Q. Huang and M. Zhang, "iBeacon enabled indoor positioning for warehouse management," 2016 4th International Symposium on Computational and Business Intelligence (ISCBI), 2016, pp. 21-26, doi: 10.1109/ISCBI.2016.7743254. (Year: 2016).*
(Continued)

*Primary Examiner* — Emmett K. Walsh
(74) *Attorney, Agent, or Firm* — Finnegan, Henderson, Farabow, Garrett & Dunner LLP

(57) ABSTRACT

The present disclosure provides a computerized method for assigning items to pickers including: determining a priority of an ordered item; inserting the item into an ordered data structure based on the priority of the item; iteratively, for items in the ordered data structure: determining an item physical location corresponding to a first unassigned item in
(Continued)

the ordered data structure; determining a plurality of picker physical locations corresponding to locations of user devices of pickers; calculating a plurality of distances between the item physical location and picker physical locations among the plurality of picker physical locations; assigning the first unassigned item by: identifying a closest picker corresponding to a shortest distance of the plurality of distances; selecting the identified picker; correlating the first unassigned item with the selected picker in a data structure; and sending information of the item and physical location to the user device of the picker.

20 Claims, 11 Drawing Sheets

(51) Int. Cl.
  *G06Q 10/087* (2023.01)
  *G06Q 30/0601* (2023.01)
  *G06Q 10/047* (2023.01)
(52) U.S. Cl.
  CPC ..... *G06Q 30/0639* (2013.01); *G06Q 30/0633* (2013.01); *G06Q 30/0643* (2013.01)

(56) References Cited

U.S. PATENT DOCUMENTS

| | | |
|---|---|---|
| 10,783,462 B1 | 9/2020 | Mo et al. |
| 2007/0067200 A1* | 3/2007 | Patel .............. G06Q 10/063114 705/7.14 |
| 2014/0351101 A1 | 11/2014 | Danelski |
| 2015/0086304 A1 | 3/2015 | Hasman et al. |
| 2016/0379164 A1 | 12/2016 | Li |
| 2017/0278047 A1 | 9/2017 | Welty et al. |
| 2018/0002531 A1 | 1/2018 | Gabbai |
| 2018/0043533 A1 | 2/2018 | Johnson et al. |
| 2019/0340561 A1 | 11/2019 | Rajkhowa et al. |
| 2020/0239234 A1 | 7/2020 | Chen |
| 2020/0311644 A1 | 10/2020 | Willard, III et al. |

FOREIGN PATENT DOCUMENTS

| | | |
|---|---|---|
| CN | 110580593 A | 12/2019 |
| KR | 10-2009-0082161 | 7/2009 |
| TW | 201905778 | 2/2017 |

OTHER PUBLICATIONS

Hong Kong Examination Notice of counterpart Hong Kong Application No. 22021031644.8 dated Jun. 6, 2022, (3 pgs.).
International Search Report in counterpart Taiwanese Patent Application No. 110115841 dated May 18, 2022 (2 pages).
Taiwan Office Action in counterpart Application No. 110115841 dated May 17, 2022 (19 pages including translation).
Korean Office Action in counterpart Application No. 10-2021-7020360 dated Jun. 17, 2022 (16 pages including translation).
International Search Report and Written Opinion in counterpart Application No. PCT/IB2020/060363 dated Jul. 23, 2021 (8 pages).
Zhao et al, "iBeacon Enabled Indoor Positioning for Warehouse Management", 2016 4th International Symposium on Computational and Business Intelligence (Year: 2016).

* cited by examiner

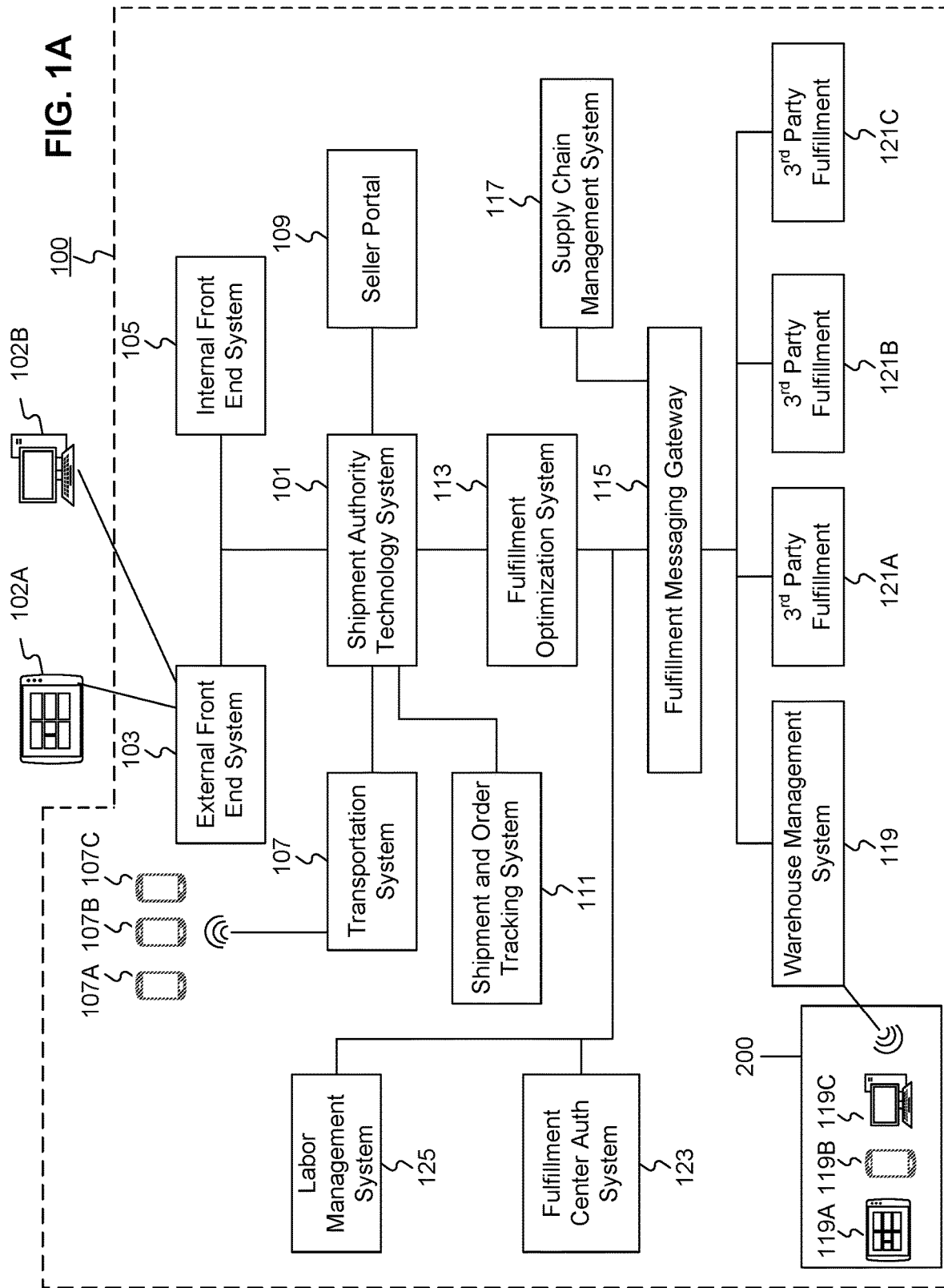

Favorites Application     login   Sign Up   Service center

[all]

My Account   Shopping Cart

Shipments   Fast Shipments   Christmas Gold deals   Regular delivery   Events / Coupons   Planned Exhibition Gift Cards Home > Food > Daily products / ice cream > Cheese > Fresh cheese > Mozzarella mozzarella cheese
285 Reviews    20,000 won

FREE Shipping
Tomorrow (Wed) 11/28 Arrival Guarantee

Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won 🚀 | 3,800 won 🚀 | 6,460 won 🚀 | 4,870 won 🚀 | 2,370 won | 2,340 won 🚀 |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and Content reference | | nutrient | None |

FIG. 1C

SYSTEMS AND COMPUTERIZED METHODS FOR OPTIMIZING ITEM RETRIEVAL ALLOCATION EFFICIENCIES

CROSS-REFERENCE TO RELATED APPLICATIONS

This application is a continuation of and claims the benefit of priority to U.S. application Ser. No. 17/082,792, filed Oct. 28, 2020 (now allowed), the contents of which are hereby incorporated herein by reference.

TECHNICAL FIELD

The present disclosure generally relates to computerized systems and methods for computer-determined item allocation. In particular, embodiments of the present disclosure relate to inventive and unconventional systems and methods utilized for ensuring efficient allocation of items to item pickers, allowing quicker assignments, faster shipment to customers, and reduced shipment cost.

BACKGROUND

Order fulfillment is a complex endeavor for businesses that provide tangible goods to customers, requiring sophisticated computer algorithms to quickly determine highly efficient order fulfillment operations. This complexity grows substantially for businesses that provide a large variety of goods, process a high volume of orders, or store items across a large physical area, including a single large warehouse, multiple warehouses, or even multiple small facilities distributed in a dispersed geographic area. This complexity greatly increases order fulfillment costs as businesses must compensate employees for time spent picking and preparing items for delivery. In addition, as the time required for an item picker to transit to an item grows, a business may be unable to fulfill as many orders and may lose customers to competitors offering similar products with a shorter delivery time, thus decreasing sales. Additionally, the business may be forced to hire additional employees, thereby increasing cost. While traditional computerized methods are able to plan some order fulfillment operations, the increased complexity of modern and/or high volume order fulfillment operations requires advanced technology to plan operations with high speed and accuracy, thus avoiding computing inefficiencies that negate efficiencies gained by volume.

Additionally, businesses have implemented order fulfillment methods dedicated to reducing shipping costs. For example, some businesses prefer to combine many items of an order in a single shipment in order to simplify delivery from a warehouse to a customer and reduce shipment and packaging costs. However, this method further increases complexity of picking operations because the business cannot ship items of an order until all the items are located and packaged. In many cases, due to algorithm inefficiencies, businesses must assign a single picker to items of a single order in anticipation of packing the items together, resulting in the picker bypassing other items from other orders while transiting. For example, while walking between items A and B for order 1, a picker may pass item C for order 2. Thus, under traditional methods, the picker would lose an opportunity to speed shipment of order 2. However, traditional algorithms and systems cannot plan complex, high volume picking operations quickly enough to solve these problems. Rather, they provide pickers with simple, unoptimized picking lists.

An alternative picking operation could resolve this missed opportunity problem by ensuring that a picker is assigned any nearby items for any shipment. This method, referred to as singleton shipping, decreases pick time and allows quicker item delivery. The singleton method also maximizes picker efficiency by reducing transit time, further reducing costs. However, although singleton shipping allows for faster delivery and reduced costs, efficient computational algorithms with speeds and accuracy necessary to implement singleton shipping have been nonexistent. Therefore, traditional methods, which simply relay a list of items of an order to a picker for retrieval so that the items may be packaged together, persist despite inefficiency and cost.

Accordingly, there is a need for improved methods and systems for computational algorithms to efficiently implement singleton shipping methods by assigning items to pickers while minimizing picking time. With these systems and methods, picking operation efficiency may increase, while delivery time decreases, thereby reducing overall business costs and improving customer satisfaction.

SUMMARY

One aspect of the present disclosure is directed to a computerized system for assigning items to pickers, comprising: at least one processor; and at least one non transitory storage medium comprising instructions that, when executed by the at least one processor, cause the at least one processor to perform steps comprising: receiving an indication of a purchase of an item; determining a priority of the item; inserting the item into a position of an ordered data structure based on the priority of the item; iteratively, for items in the ordered data structure: determining an item physical location corresponding to a first unassigned item in the ordered data structure; determining a plurality of picker physical locations corresponding to locations of user devices of pickers; calculating a plurality of distances between the item physical location and picker physical locations among the plurality of picker physical locations; assigning the first unassigned item by: identifying a closest picker corresponding to a shortest distance of the plurality of distances; selecting the identified picker; correlating the first unassigned item with the selected picker in a data structure; sending information including an identifier of the item and a physical location of the item to the user device of the selected picker for display.

Another aspect of the present disclosure is directed to a computer-implemented method for assigning items to pickers, comprising: receiving an indication of a purchase of an item; determining a priority of the item; inserting the item into a position of an ordered data structure based on the priority of the item; iteratively, for items in the ordered data structure: determining an item physical location corresponding to a first unassigned item in the ordered data structure; determining a plurality of picker physical locations corresponding to locations of user devices of pickers; calculating a plurality of distances between the item physical location and picker physical locations among the plurality of picker physical locations; assigning the first unassigned item by: identifying a closest picker corresponding to a shortest distance of the plurality of distances; selecting the identified picker; correlating the first unassigned item with the selected picker in a data structure; sending information including an identifier of the item and a physical location of the item to the user device of the selected picker for display.

Yet another aspect of the present disclosure is directed to a computer-implemented method for assigning items to pickers, comprising: receiving an indication of a purchase of an item; determining a priority of the item; inserting the item into a position of an ordered data structure of items based on the priority of the item; iteratively, for items in the ordered data structure: determining an item physical location corresponding to a first unassigned item in the ordered data structure; determining a plurality of picker physical locations corresponding to locations of user devices of pickers; calculating a plurality of distances between the item physical location and picker physical locations among the plurality of picker physical locations; calculating a plurality of routes, each route being calculated for each picker physical location within a distance threshold of the item physical location, and calculated to avoid obstacles; assigning the first unassigned item by: identifying a closest picker corresponding to a shortest route of the plurality of routes; determining that a quantity of items in an item queue of the closest picker exceeds a threshold; identifying a second closest picker corresponding to a second shortest distance of the plurality of distances; inserting the first unassigned item into an item queue of the second closest picker; sending information including an identifier of the item and a physical location of the item to the user device of the second closest picker for display.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1C depicts a sample Single Display Page (SDP) that includes a product and information about the product along with interactive user interface elements, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for intelligent systems for optimizing package acquisition efficiencies.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
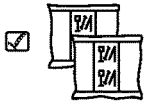
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
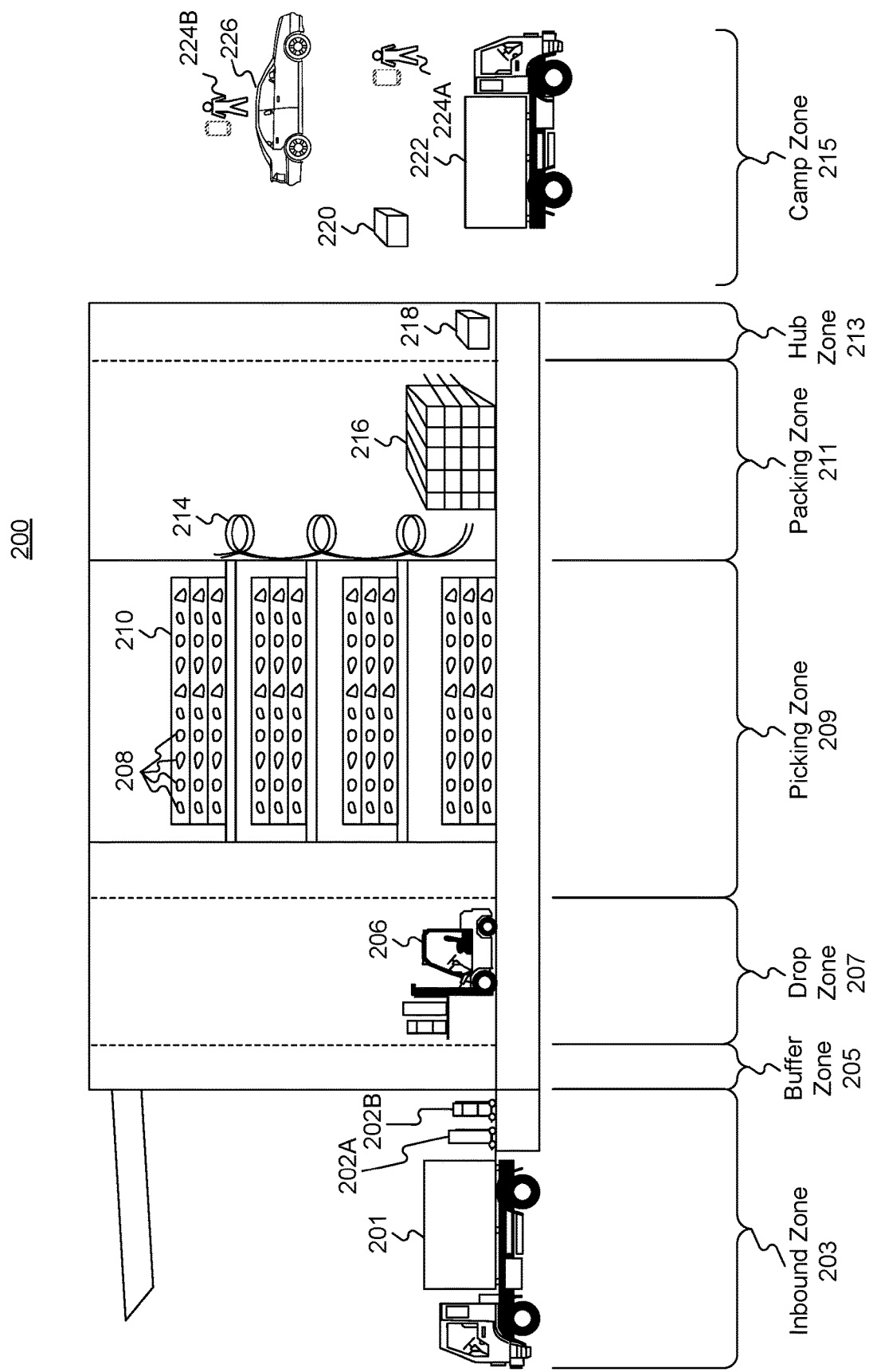
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119G to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 2246.

Figure 3:
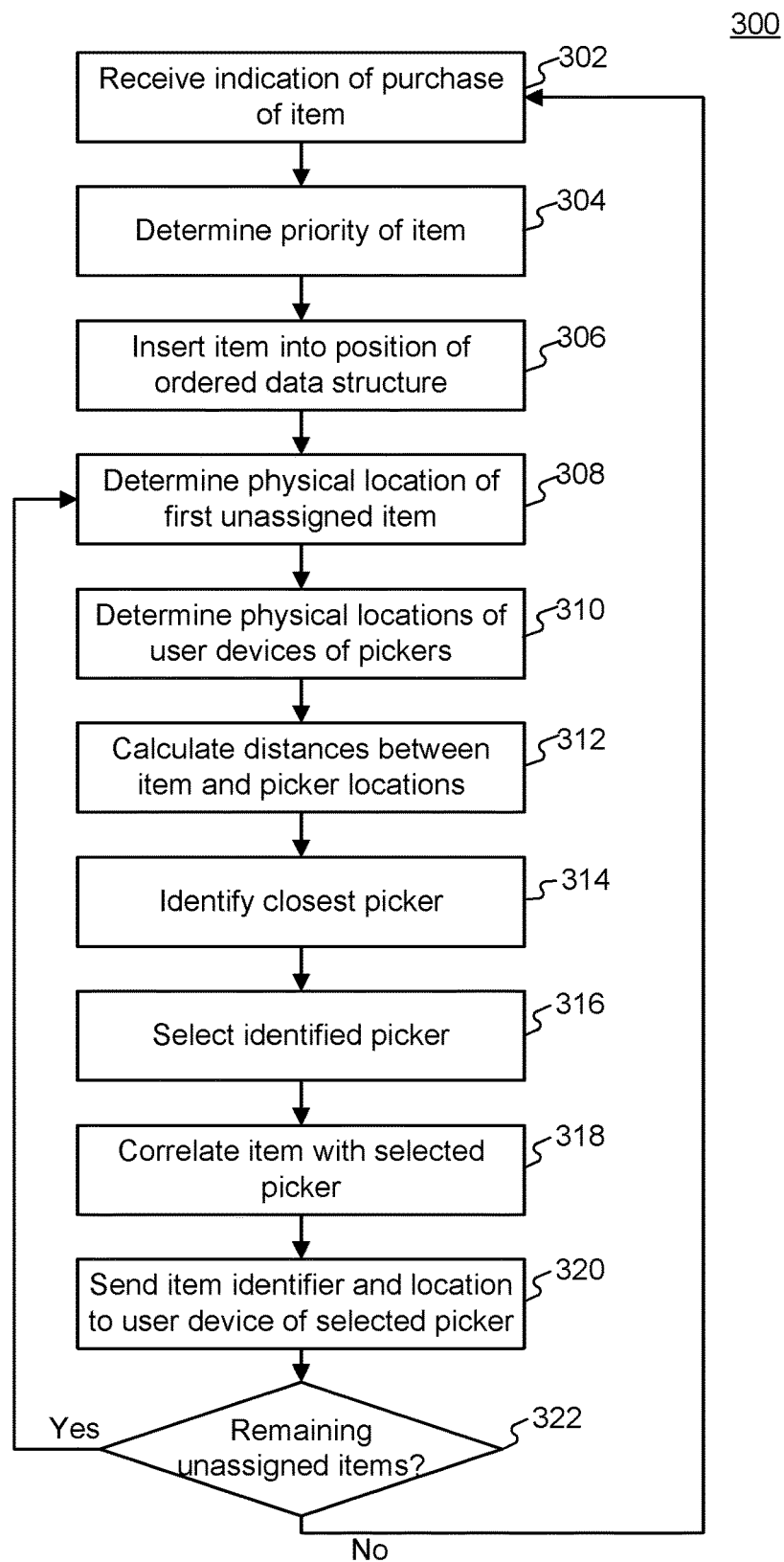
FIG. 3 is a flow chart illustrating an exemplary embodiment of a method for assigning items to pickers, consistent with the disclosed embodiments.

FIG. 3 illustrates an outline of a main process 300 for assigning items to pickers. In step 302, FO system 113 begins with receiving an indication of a purchase of an item, such as an order comprising at least one item. The indication may be received from External Front End System 103, for instance. In some embodiments, the indication may be provided directly from a customer device. The order may constitute a variety of items and quantities distributed in a warehouse, plurality of warehouses, or other storage sites. In some situations, an item may comprise a quantity of a bulk good that requires a picker to visit multiple sites to obtain the requested quantity. For example, an order may require 1,000 lbs of corn, while each of a plurality of storage sites only contain 300 lbs of corn. Similarly, an item may require multiple, separately stored pieces, such as a bicycle having a frame and tires stored in different locations in a warehouse. Thus, process 300 may help assign an item requiring multiple stops, as well as individual items requiring a single stop by a picker. Process 300 may also assign multiple pickers to items requiring multiple stops, thereby distributing the picking operation and speeding package preparation.

At step 304, FO system 113 determines a priority of the item. A customer may assign a priority to an order at the time of purchase, for instance, by electing to pay an additional charge for quicker delivery. A business may also assign a priority to an item by customer priority such as a premier plan membership, item perishability, picker availability, special handling requirements for an item including weight and size limitations or special equipment needs, transportation regulations, traffic, tolls, and other shipping cost considerations. In some embodiments, FO system 113 may determine priority based on an amount of time remaining until a required shipping time of the item, for instance, to meet a delivery time promised to a customer at the time of purchase. Items may have high fidelity priorities, such that an item with 65 minutes until shipping has a higher priority than an item with 69 minutes until shipping. Alternatively, items may be categorized as urgent, such as items with less than 30 minutes until shipping, normal, such as items with more than 30 minutes and less than 90 minutes until shipping, and low, such as items with more than 90 minutes until shipping.

At step 306, FO system 113 inserts the item into a position of an ordered data structure based on the priority of the item. For example, an identifier of the item may be placed into a position in a list or a tuple such that items with a higher priority remain at their respective ranks while items with a lower priority are shifted down a rank. In some embodiments, FO system 113 may use a JSON file or dictionary that does not have a reliably consistent order. In these situations, FO system 113 may introduce order into the data structure by creating a field in the JSON file indicating the item's rank. FO system 113 may update each item's rank field in the JSON file if an item with a higher priority is introduced. Alternatively, in embodiments where priority categories are used, FO system 113 may store an item in a JSON file, SQL database, spreadsheet file (e.g., Microsoft Excel file), comma separated value file, and the like with a corresponding field representing the item's priority category.

At step 308, FO system 113 begins analyzing purchased items and pickers in order to assign items to pickers. In step 308, FO system 113 determines an item physical location corresponding to a first unassigned item in the ordered data structure. FO system 113 may determine the first unassigned item by selecting the item with the highest priority in the ordered data structure. If the data structure is a JSON file, FO system 113 may create a sub-dictionary containing all items with an empty assigned picker field, followed by determining which of the items in the sub-dictionary has highest priority. If priority categories are used instead, FO system 113 may randomly select an item tagged with the highest priority category, or may further prioritize items within a priority category based on price or weight, for instance. To determine the item physical location corresponding to the first unassigned item, FO system 113 may look up the item in a separate database or data structure and retrieve the stored physical location associated with the item. The physical location may be a street address or a warehouse shelf, for instance.

At step 310, FO system 113 determines a plurality of picker physical locations corresponding to locations of user devices of pickers. For example, the user device of a picker may be device 1198. Each picker on a warehouse floor may carry a separate device. Devices may include hardware and/or software to determine the location's position. Devices may determine and periodically report their respective locations to FO system 113, such as using a WiFi or cellular signal to report the device's position as determined by a GPS receiver in the device. In some embodiments, devices may determine locations by measuring a signal strength, such as WiFi, and triangulating the device location based on a plurality of WiFi signals. Alternatively or additionally, FO system 113 may determine or request locations of devices. For instance, a warehouse may also have other sensors, such as IR sensors, which receive IR signals from user devices signaling an identification code, or RFID sensors that register the presence of an RFID tag disposed on a user device. A warehouse may also contain cameras to visually identify and locate pickers and/or their associated devices, carts, and packages. Visual identification may be aided by identifying images, such as a QR code, facial recognition, and the like. FO system 113 may correlate these codes in a database to a device and corresponding user.

At step 312, FO system 113 calculates a plurality of distances between the item physical location and picker physical locations among the plurality of picker physical locations. In other words, after step 310, FO system 113 may have a data structure containing locations of each of the pickers in a warehouse, for instance. FO system 113 then cycles through each of the locations and calculates a distance between an unassigned item and pickers.

After step 312, FO system 113 may store a data structure having distances between each of the pickers and the unassigned item. In some embodiments, the distance may be a direct line between the item and a picker, ignoring any intervening obstacles. Alternatively, each of the plurality of distances may comprise a total length of a path between a corresponding picker physical location and the item physical location, the path being selected so as to avoid obstacles between the corresponding picker physical location and the item physical location. Distances may also be measured as the amount of time required to travel between two points, rather than the geometric length of a path. That is, FO system 113 may employ algorithms to determine the shortest route and expected travel time between two points while traveling around any obstacles such as shelves, containers, pillars, walls, or doors as reflected in a stored map of a warehouse. FO system 113 may also employ algorithms that take into account distances between floors, such as in a multi-story warehouse. In some embodiments, FO system 113 may provide instructions to pickers who must travel through an area. In these embodiments, FO system 113 may determine the shortest path along highways and surface streets, as well as distances for parking, walking, or other modes of transportation.

Algorithms that determine optimal paths through obstacles may be computationally expensive and slow. Therefore, in some embodiments, FO system 113 may perform a preliminary step of determining a direct radial distance between pickers and the unassigned item before determining optimal paths. FO system 113 may then skip any pickers outside of a threshold radius when determining optimal paths around obstacles, potentially shortening processing time. For example, FO system 113 may determine that out of ten possible pickers, three are outside of a 200 foot radius of an unassigned item. FO system 113 may then calculate optimal paths for the remaining seven pickers, avoiding lost computational time spent calculating optimal paths for pickers that are too far away. In this way, the plurality of picker physical locations may consist of picker physical locations within a threshold radius of the item physical location.

Using the data structure having distances between each of the pickers and the unassigned item may be sortable or searchable, such that FO system 113 is able to begin assigning the first unassigned item by identifying a closest picker corresponding to a shortest distance of the plurality of distances at step 314. The closest picker may be the picker having the shortest travel time or shortest travel duration.

FO system 113 may then select the identified picker at step 316, and correlate the first unassigned item with the selected picker in a data structure at step 318. In some embodiments, the data structure of step 318 may be a separate dictionary, JSON file, or the like containing an item identifier correlated to a picker identifier. Alternatively, step 318 may comprise updating a field in the ordered data structure. For example, when a new item is inserted into the ordered data structure at step 307, FO system 113 may include a field for the new item that FO system 113 later populates with a picker identifier at step 318.

In some embodiments, the data structure of step 318 may be indexed by picker identifier, such that a picker identifier is correlated to an item queue assigned to the picker, with the order indicating the order in which the picker should locate the items. The first unassigned item may be inserted into an item queue based on a priority of the first unassigned item. For example, a picker may have an item queue containing ten normal priority items. The picker may be the closest of all pickers to an urgent item. FO system 113 may then enter the urgent item into the first position in the item queue of the picker, and shift the other ten items with normal priority. In some situations, changing a picker's destination before the picker finds the item may introduce delays. For example, a picker may be climbing stairs to obtain a normal priority item on an upper floor of a warehouse. Even though the picker may be closest to an urgent priority item on a lower floor, assigning the urgent priority item to the picker may cause the picker to descend the stairs, deliver the urgent item, and then reclimb stairs to obtain the normal priority item. Therefore, in some embodiments, FO system 113 may leave some portion of item queues unchanged, and only insert new items into an item queue after, for instance, the second item in the queue.

At step 320, FO system 113 sends information including an identifier of the item and a physical location of the item to the user device of the selected picker for display. The information may also include a map and/or directions for the picker. At step 322, FO system 113 may determine if there are any remaining unassigned items. If step 322 is YES, FO system 113 returns to step 308 and begins assigning an additional item. This may continue in an iterative fashion for items in the ordered data structure until all items are assigned to pickers. If step 322 is NO, FO system 113 may return to step 302 and wait for an additional indication of a purchase of an item. Steps 302 through 306 may operate in parallel with steps 308 through 322 so that FO system 113 continues to receive new purchases while simultaneously assigning items.

Figure 4:
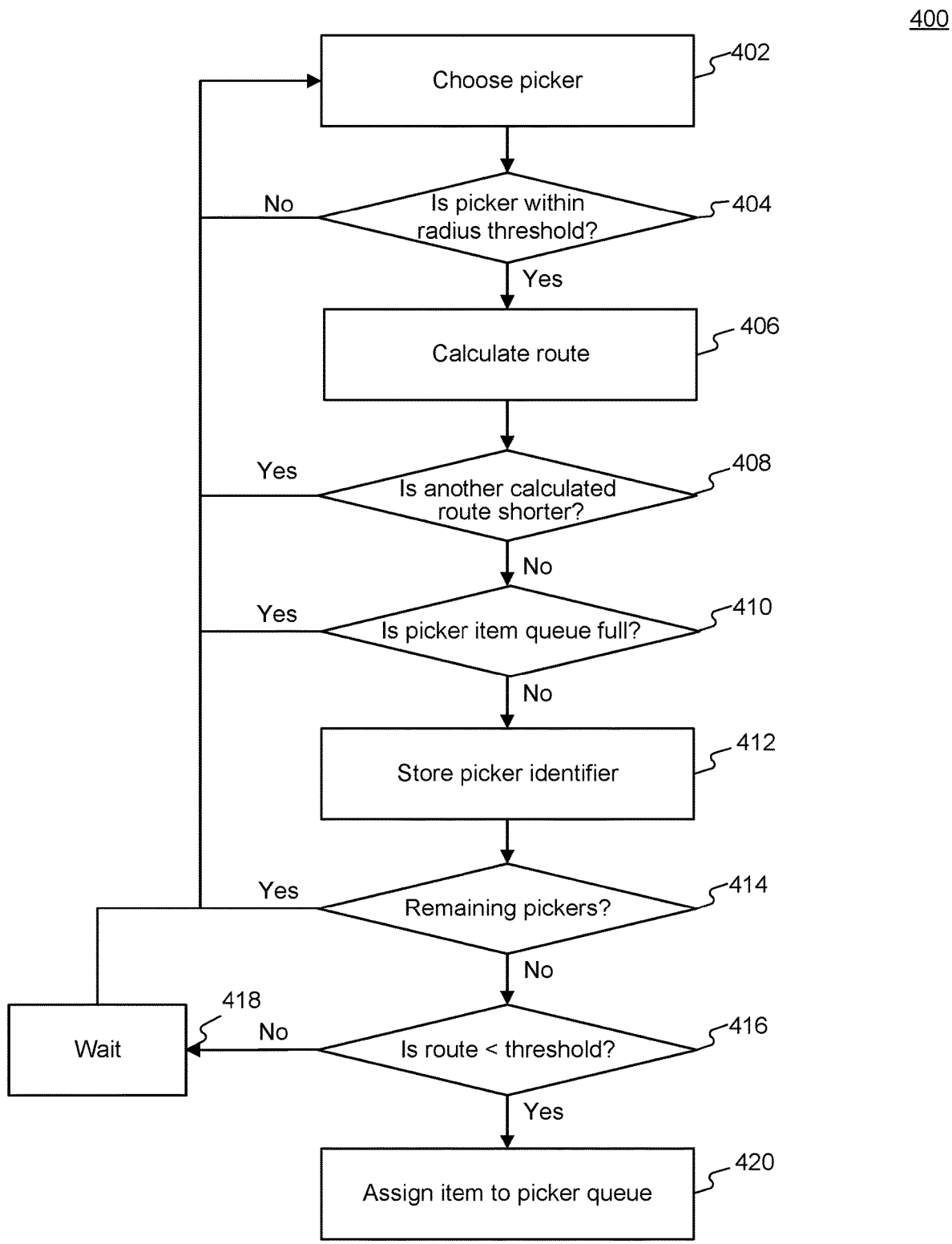
FIG. 4 is a flow chart illustrating an exemplary embodiment of a method for assigning items to pickers based on picker location and existing assignments, consistent with the disclosed embodiments.

The process by which FO system 113 assigns items to pickers may be further understood by reference to FIG. 4 showing a flow chart of subroutine 400 for assigning items to pickers based on picker location and existing assignments, consistent with the disclosed embodiments. Elements of subroutine 400 may be incorporated into process 300 and may further optimize assignments, for instance, in conjunction with step 316 of process 300.

Subroutine 400 may be applied to a set of pickers, such as every active picker at a particular time, and may iteratively analyze each picker. Starting at step 402, FO system 113 may choose a picker from the set. Selection may be random, alphabetical, by picker identifier order, and the like. FO system 113 then determines if the picker is within a radius threshold, such as within 200 feet of an unassigned item currently being assigned. If the picker is outside of the radius threshold, step 404 is NO, and FO system returns to step 402 to choose a different picker. If the picker is inside the radius threshold, step 404 is YES, and FO system may then invest additional computational resources to further consider the picker at step 406.

At step 406, FO system 113 calculates a route from the picker's location to the item as previously described. At step 408, FO system 113 compares the calculated route to the shortest calculated route. The comparison may be based on distance or predicted travel time. If there is another route corresponding to another picker that is shorter than the current route, step 408 is YES, and FO system 113 chooses a new picker at step 402. On the other hand, if the current route is the shortest route so far calculated, including if the current route is the first route calculated, step 408 is NO, and FO system 113 proceeds to step 410.

At step 410, FO system 113 determines if the item queue of the picker having the shortest calculated route so far is full. That is, FO system 113 may have a threshold limit of the number of items in an item queue. The threshold limit may be constant for every picker. Alternatively, the threshold limit may vary for different pickers. For instance, some pickers may be able to move more quickly through a warehouse, or may receive more compensation for agreeing to pick more items during a shift. If the item queue of the picker is full, step 410 is YES, and FO system 113 returns to step 402 to choose a new picker. If step 410 is NO, FO system 113 stores an identifier of the picker in memory at step 412, as well as the calculated route length corresponding to the picker. Thus, in some situations, FO system 113 may choose a next picker if a length of an item queue of the closest picker exceeds a threshold, even if the route length of the next picker is longer.

At step 414, FO system 113 determines if there are any pickers that have not yet been analyzed. If there are more remaining pickers, step 414 is YES, and FO system 113 returns to step 402. If there are no more remaining pickers, step 414 is NO, and FO system 113 proceeds to step 416. In this way, after step 414 is NO, FO system 113 will have analyzed each of the pickers and determined a picker having a shortest distance to the item, and having an item queue with room to accept an additional item.

However, in some cases, the closest picker may nonetheless be far from the item. Assigning the item to this picker may cause a delay in picking other items. Therefore, in some embodiments, FO system 113 may ensure that assignments only occur if a picker is within a certain distance of the item. At step 416, FO system 113 determines if the route of the picker having the shortest route is less than a threshold. If the route is not less than the threshold, step 416 is NO, and FO system 113 waits for a period of time at step 418. FO system 113 may then return to step 402 and reidentify a closest picker after the period of time expires. During the wait period 418, pickers may move closer to the item in the process of picking other items. Thus, when FO system 113 re-analyzes pickers, FO system 113 may identify a picker that has moved within the threshold distance of the item, thereby reducing unproductive transit time. On the other hand, if the shortest distance is less than the threshold, step 416 is YES, and FO system 113 identifies a closest picker corresponding to a shortest distance of the plurality of distances and assigns the item to the picker's item queue at step 420. In some embodiments, items in the ordered data structure may be periodically reassigned to new pickers based on updated picker physical locations.

In some situations, though, a business may prioritize ensuring delivery be a promised time, rather than reducing lost transit time. Therefore, the distance threshold of subroutine 400 may be based on the priority of the item. For example, a business may have a rule that a picker should travel less than 200 feet for a normal priority item because longer distances may result in pickers passing other items that need to be picked, reducing efficiency. However, the business may allow a picker to travel up to 500 feet for urgent priority items, rather than waiting for a picker to come closer in the course of picking other items, to ensure timely delivery.

Figure 5A:
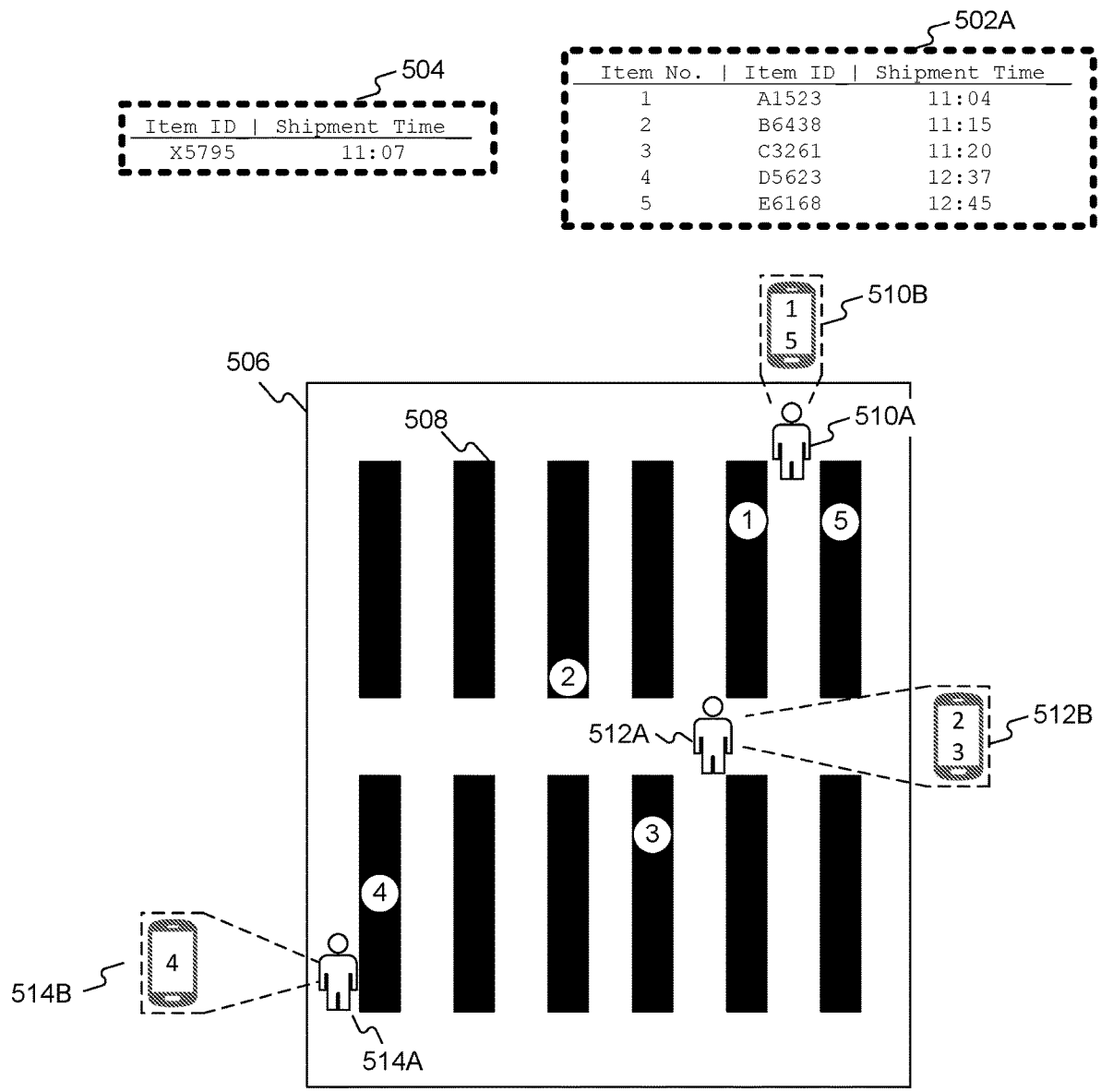
FIG. 5A is a diagrammatic illustration of an initial assignment of items to corresponding pickers, consistent with the disclosed embodiments.
Figure 5B:
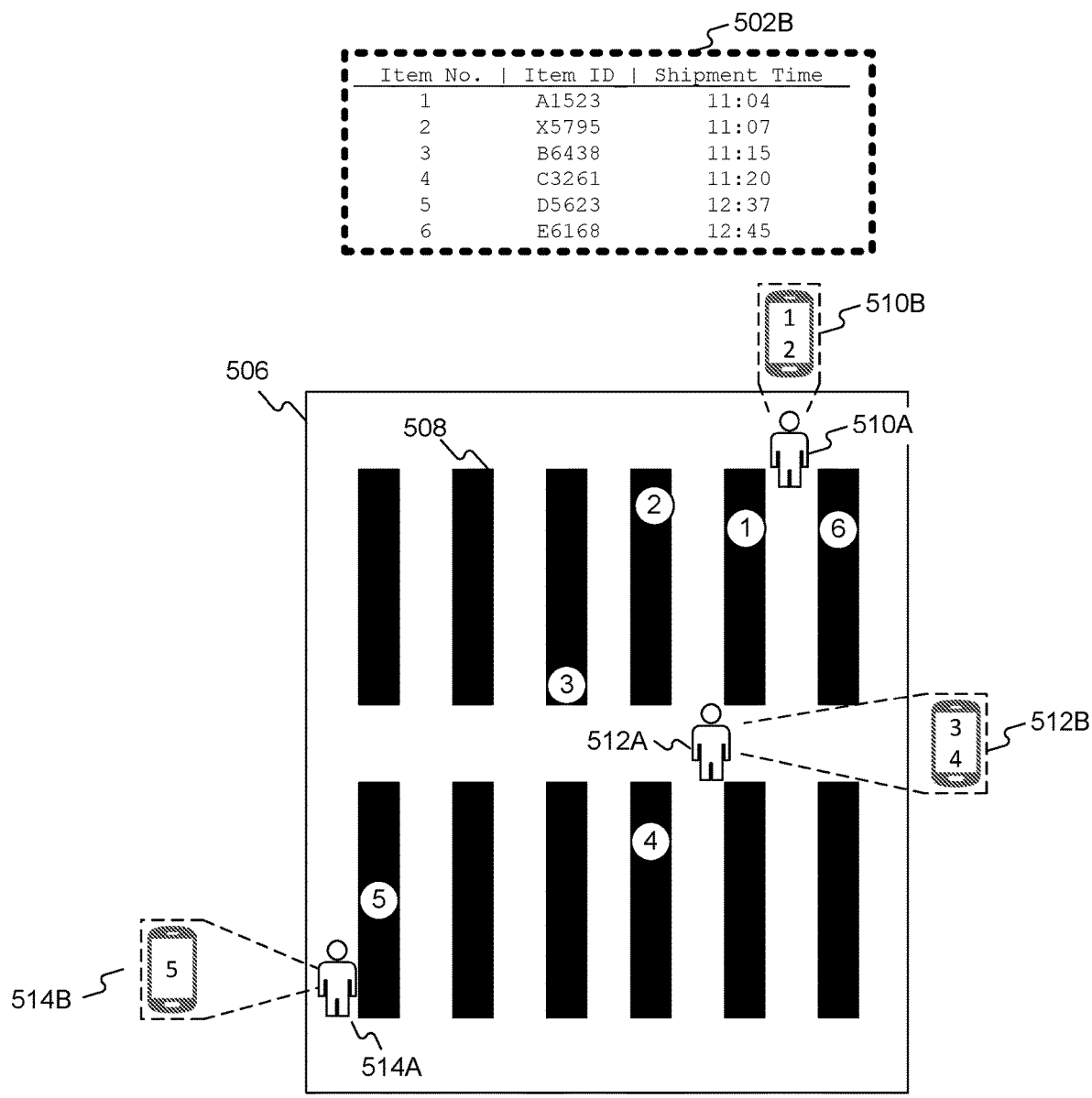
FIG. 5B is a diagrammatic illustration of a revised assignment of items to corresponding pickers, consistent with the disclosed embodiments.

The effects of process 300 and subroutine 400 may be further understood by reference to FIG. 5A showing diagrammatic illustration of an initial assignment of items to corresponding pickers, consistent with the disclosed embodiments, as well as FIG. 5B showing a diagrammatic illustration of a revised assignment of items to corresponding pickers, consistent with the disclosed embodiments.

In FIG. 5A, an exemplary data structure 502A records a list of items including a rank, an item ID, and a promised shipping time. For example, item 2 has ID B6438 and needs to be shipped by 11:15. Pickers 510A, 512A, and 514A, carrying user devices 510B, 512B, and 514B, work in warehouse 506. Warehouse 506 contains shelves 508. Warehouse 506 also contains the five items included in data structure 502A, having locations in warehouse 506 illustrated as 1, 2, 3, 4, and 5.

As shown in FIG. 5A, items have been assigned to pickers 510A, 512A, and 514A. The items are displayed on user devices 510B, 512B, and 514B. For instance, picker 512A carries user device 512B which displays the numbers 2 and 3, indicating that picker 512A has been assigned to pick items 2 and 3.

Further, FIG. 5A shows a new indication of a purchased item 504. New indication 504 contains an item ID of X5795 and a shipment time of 11:07.

FIG. 5B illustrates how FO system 113 incorporates new indication 504 into data structure 502A, as well as assigning the item of new indication 504 to a picker. Data structure 502B has been changed to now include item X5795. Because the shipment time of item X5795 is 11:07, item X5795 has been inserted into data structure 502B as item number 2, placing it after item number 1 with shipment time of 11:04, and before items 3-6 having shipment times from 11:15 through 12:45, and having previously been recorded in data structure 502A as items 2-5. Item locations in warehouse 506 have also been updated to show the reordered items.

As shown in FIG. 5B, item 2, corresponding to the item from new indication 504, is located close to picker 510A. Therefore, picker 510A has been assigned items 2 and 1, indicated on user device 510B. Item 6, which was formerly item 5, is no longer displayed on user device 510B as item 6 has a longer time until shipment than item 2. Meanwhile, item 5, which was formerly item 4, remains assigned to picker 514A, and items 3 and 4, which were formerly items 2 and 3, remain assigned to picker 512B.

Item 6 may remain on an undisplayed portion of the item queue of picker 510A. If the item queue threshold is set to two, such that a picker's item queue may only have two items, item 6 may be transferred to the item queue of picker 514A, being the closest picker with an open item queue slot. Alternatively, item 6 may remain unassigned until pickers remove items from their queues by indicating that they have picked the items, until another picker moves closer, or until it has a higher rank in the ordered data structure 502B.

Thus, as shown items may be reassigned based on new items and corresponding priorities, as well as reassigned based on new picker locations. Further, although FIGS. 5A and 5B illustrate changing the first two items in a picker queue, in some embodiments, the first portion of an item queue may remain static until a picker retrieves items in the first portion of the item queue.

Figure 6A:
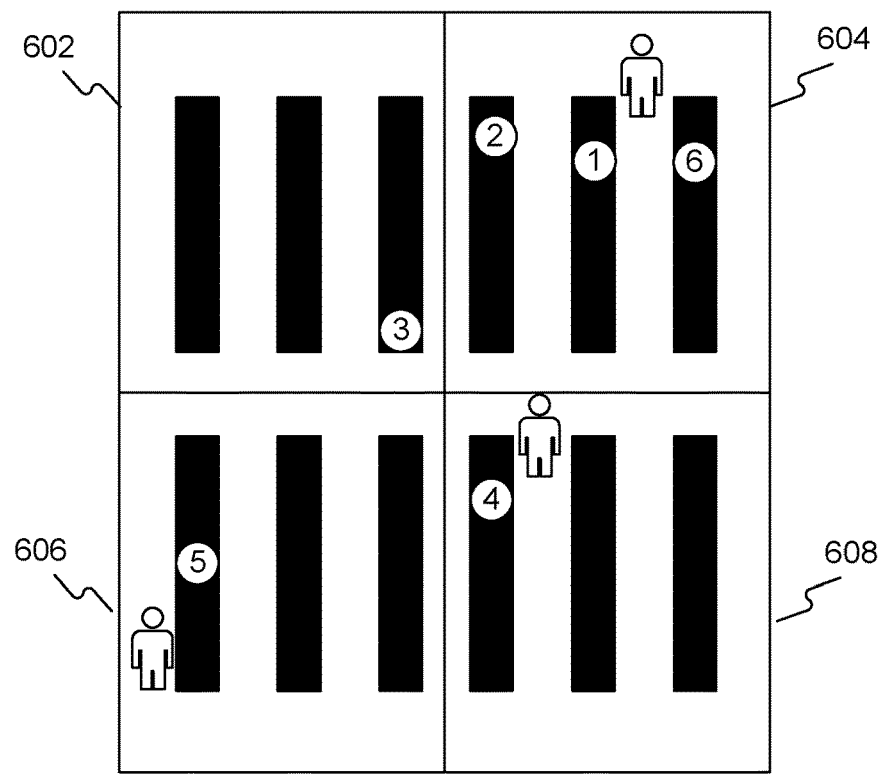
FIG. 6A is a diagrammatic illustration of item and picker locations, consistent with the disclosed embodiments.
Figure 6B:
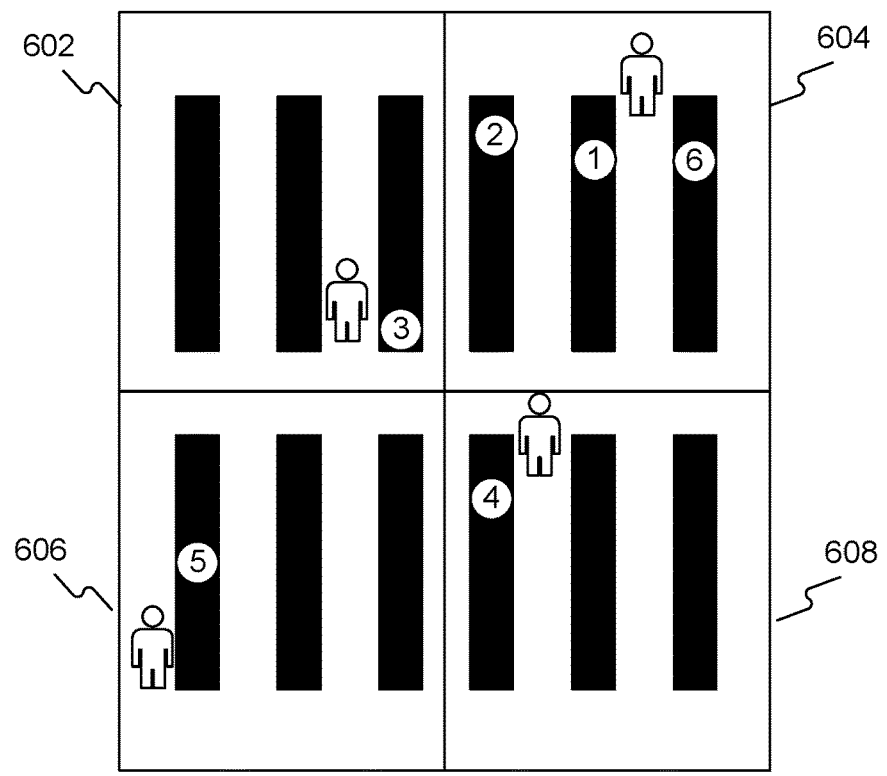
FIG. 6B is a diagrammatic illustration of an initial picker assignment, consistent with the disclosed embodiments.

In some situations, a new picker may enter a picking area, such as when the picker's shift begins or after a break. FO system 113 may initialize the new picker with items in order to relieve other pickers and speed picking of pending items. FIG. 6A, showing a diagram of item and picker locations, and FIG. 6B, showing initial picker assignments, illustrate processes by which FO system 113 may initialize the new picker.

After FO system 113 receives an indication that a new picker exists, FO system 113 may define a plurality of regions of a facility. For instance, as shown in FIGS. 6A and 6B, a warehouse may be divided into four quadrants, 602, 604, 606, and 608. Pickers and items are distributed among the quadrants. In some embodiments, a region, such as a geographical area, may be divided.

For each region, FO system 113 determines the number of items and the number of pickers in the region. FO system 113 may determine the number of items by accessing the ordered data structure, and may determine the number of pickers by accessing a data structure or actively pinging or locating devices associated with the pickers, as described above. For example, in FIG. 6A, region 604 has one picker and three items, while region 602 has zero pickers and one item. FO system 113 may then determine a ratio of items to pickers located in each region. Thus, region 604 has a ratio of 3:1, region 606 has a ratio of 1:1, and region 608 has a ratio of 1:1. FO system 113 may ignore regions having zero pickers, or may record regions having zero pickers as having an artificial large number indicating a need for pickers in the region, such as 1,000,000. FO system 113 then selects the region having the highest ratio. Thus, in FIG. 6A, FO system 113 would determine that region 602 has the highest ratio.

Accordingly, FO system 113 selects region 602 as requiring a picker, and FO system 113 selects an initializing item located in a region having a highest ratio. FO system 113 may then send sending information including an identifier of the initializing item and a physical location of the initializing item to a user device of the new picker for display. Thus, as shown in FIG. 6B, the new picker is assigned to pick item 3 of region 602.

As an exemplary embodiment of the present disclosure, a computer-implemented method for assigning items to pickers may comprise the following steps. FO system 113 may receive an indication of a purchase of an item, determine a priority of the item, and insert the item into a position of an ordered data structure of items based on the priority of the item. The priority of the item may be categorical or sequential.

FO system 113 may iteratively, for items in the ordered data structure, determine an item physical location corresponding to a first unassigned item in the ordered data structure. FO system 113 may also determine a plurality of picker physical locations corresponding to locations of user devices of pickers; calculate a plurality of distances between the item physical location and picker physical locations among the plurality of picker physical locations; and calculate a plurality of routes, each route being calculated for each picker physical location within a distance threshold of the item physical location, and calculated to avoid obstacles. For example, FO system 113 may ignore pickers outside of a 500 foot distance of the item physical location.

FO system 113 may then proceed to assigning items to pickers by identifying a closest picker corresponding to a shortest route of the plurality of routes. FO system 113 may then determine that a quantity of items in an item queue of the closest picker exceeds a threshold; and proceed to identify a second closest picker corresponding to a second shortest distance of the plurality of distances. When the second closest picker is identified, FO system 113 inserts the first unassigned item into an item queue of the second closest picker, and sends information including an identifier of the item and a physical location of the item to the user device of the second closest picker for display.

Process 300 and subroutine 400 are not limited to the specific set of steps and may comprise modifications, omissions and/or combinations of the core algorithm steps optimized to fit specifics of each subroutine.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computerized system for assigning items to pickers, comprising:
    at least one processor;
    at least one IR sensor; and
    at least one non transitory storage medium comprising instructions that, when executed by the at least one processor, cause the at least one processor to perform steps comprising:
        inserting a purchased item into a position of a data structure;
        iteratively, for items in the data structure:
            receiving, by the at least one IR sensor, IR signals from user devices;
            determining a plurality of picker physical locations corresponding to locations of user devices of pickers based on the received IR signals;
            calculating a plurality of distances between an item physical location and picker physical locations among the plurality of picker physical locations;
            assigning a first unassigned item by:
                identifying a closest picker corresponding to a shortest distance of the plurality of distances;
                sending information to the user device of the identified picker for display;
            receiving an indication that a new picker exists; and iteratively, for each region of a plurality of regions of a facility:
  determining a ratio of number of items in the ordered data structure located in the region to a number of pickers located in the region;
  selecting an initializing item located in a region having a highest ratio; and
  sending information to a user device of the new picker for display.

2. The system of claim 1, wherein each of the plurality of distances comprises a total length of a path between a corresponding picker physical location and the item physical location, the path being selected so as to avoid obstacles between the corresponding picker physical location and the item physical location.

3. The system of claim 2, wherein the plurality of picker physical locations consists of picker physical locations within a threshold radius of the item physical location.

4. The system of claim 1, wherein assigning the first unassigned item further comprises:
  selecting a next picker if a length of an item queue of the closest picker exceeds a threshold.

5. The system of claim 1, wherein the first unassigned item is inserted into an item queue based on a priority of the first unassigned item.

6. The system of claim 1, wherein the priority of the item is based on an amount of time remaining until a required shipping time of the item.

7. The system of claim 1, wherein assigning the first unassigned item further comprises:
  identifying a closest picker corresponding to a shortest distance of the plurality of distances when the shortest distance is less than a threshold.

8. The system of claim 1, wherein assigning the first unassigned item further comprises:
  waiting a period of time when the shortest distance is greater than the threshold;
  reidentifying a closest picker after the period of time expires.

9. The system of claim 8, wherein the threshold is based on the priority of the first item.

10. The system of claim 1, wherein the items in the ordered data structure are periodically reassigned to new pickers based on updated picker physical locations.

11. A computer-implemented method for assigning items to pickers, comprising:
  inserting a purchased item into a position of a data structure;
  iteratively, for items in the data structure:
    receiving, by at least one IR sensor, IR signals from user devices;
    determining a plurality of picker physical locations corresponding to locations of user devices of pickers based on the received IR signals;
    calculating a plurality of distances between an item physical location and picker physical locations among the plurality of picker physical locations;
    assigning a first unassigned item by:
      identifying a closest picker corresponding to a shortest distance of the plurality of distances;
      sending information to the user device of the identified picker for display;
  receiving an indication that a new picker exists; and
  iteratively, for each region of a plurality of regions of a facility:
    determining a ratio of number of items in the ordered data structure located in the region to a number of pickers located in the region;
    selecting an initializing item located in a region having a highest ratio; and
    sending information to a user device of the new picker for display.

12. The method of claim 11, wherein each of the plurality of distances comprises a total length of a path between a corresponding picker physical location and the item physical location, the path being selected so as to avoid obstacles between the corresponding picker physical location and the item physical location.

13. The method of claim 12, wherein the plurality of picker physical locations consists of picker physical locations within a threshold radius of the item physical location.

14. The method of claim 11, wherein assigning the first unassigned item further comprises:
  selecting a next picker if a length of an item queue of the closest picker exceeds a threshold.

15. The method of claim 11, wherein the first unassigned item is inserted into an item queue based on a priority of the first unassigned item.

16. The method of claim 11, wherein the priority of the item is based on an amount of time remaining until a required shipping time of the item.

17. The method of claim 11, wherein assigning the first unassigned item further comprises:
  identifying a closest picker corresponding to a shortest distance of the plurality of distances when the shortest distance is less than a threshold.

18. The method of claim 11, wherein assigning the first unassigned item further comprises:
  waiting a period of time when the shortest distance is greater than the threshold;
  reidentifying a closest picker after the period of time expires.

19. The method of claim 18, wherein the threshold is based on the priority of the first item.

20. The method of claim 11, wherein the items in the ordered data structure are periodically reassigned to new pickers based on updated picker physical locations.

* * * * *